United States Patent [19]

Spaulding

[11] 3,783,185

[45] Jan. 1, 1974

[54] MULTI-COLOR ACOUSTOOPTIC MODULATOR

[75] Inventor: Richard A. Spaulding, Rochester, N.Y.

[73] Assignee: Eastman Kodak Company, Rochester, N.Y.

[22] Filed: Jan. 28, 1972

[21] Appl. No.: 221,668

[52] U.S. Cl. .................................. 178/5.2, 178/6.7

[51] Int. Cl. .......................... H04n 1/46, H04n 5/84

[58] Field of Search ....................... 178/5.2, 5.4 CD, 178/5.4 BD, 7.3 D, 6.7 A, 6.7, 6

[56] References Cited

UNITED STATES PATENTS

| | | | |
|---|---|---|---|
| 3,544,718 | 12/1970 | Adler | 178/6.7 R |
| 3,622,690 | 11/1971 | Stephens et al. | 178/6.7 R |
| 3,303,276 | 2/1967 | Haeff | 178/7.3 D |
| 3,314,075 | 4/1967 | Becker et al. | 178/6.7 R |
| 3,614,312 | 10/1971 | Fournier et al. | 178/7.3 D |
| 3,597,536 | 8/1971 | Fowler | 178/7.3 D |
| 3,316,348 | 4/1967 | Hufnagel et al. | 178/6.7 R |
| 3,700,805 | 10/1972 | Hanlon | 178/7.3 R |

*Primary Examiner*—Gareth D. Shaw
*Attorney*—Robert W. Hampton et al.

[57] ABSTRACT

An apparatus and method are disclosed for acoustooptically modulating and diffracting a plurality of optical wavelengths contained in laser light impinging on an acoustooptic cell to form a composite output beam comprising intensity modulated component beams of selected wavelengths present in the impinging laser light. To accomplish this, a plurality of amplitude modulated electrical signals of different fixed frequencies are applied to an electrical-to-acoustical transducer operatively attached to the cell. Every frequency applied to the transducer produces an acoustic wave within the cell to form a diffraction spectrum of the wavelengths present in the laser light impinging or incident on the cell. The acoustic wave producing electrical frequencies are chosen such that diffracted component beams of selected wavelengths are collinear. Thus, the collinear component beams form a composite output beam comprising the selected diffracted wavelengths. Non-collinear beams of the selected wavelengths as well as unwanted diffracted wavelengths and undiffracted beams are masked or blocked from further passage through the optical system. The amplitudes of the electrical signals producing the acoustic waves within the cell are modulated independently to control the intensities of the individual component beams of selected wavelengths present in the composite output beam. The laser light impinging on the cell can comprise a single multi-wavelength beam; two collinear beams of different wavelengths and a third noncollinear beam of another wavelength; or beams of different wavelengths can be mutually noncollinear, the angles of impingement being chosen in accordance with what electrical frequencies are applied to the transducer.

28 Claims, 13 Drawing Figures

MULTI-COLOR ACOUSTOOPTIC MODULATOR

REFERENCE TO RELATED U.S. PATENT APPLICATIONS

Reference is made to U.S. Patent Application Ser. No. 132,955 entitled "Acoustooptic Scanner Apparatus and Method" filed Apr. 12, 1971 to Richard A. Spaulding and Royce D. Pickering and to U.S. Patent Application Ser. No. 192,452 entitled "X-Y Optical Scanning System" to Royce D. Pickering filed Oct. 26, 1971.

FIELD OF THE INVENTION

The invention relates to acoustooptic modulators and more particularly to an acoustooptic modulator for producing an output beam comprising a plurality of collinear independently modulated component beams of selected optical wavelengths.

BACKGROUND OF THE INVENTION

To provide a modulated light beam comprising a plurality of optical wavelengths, prior art devices and methods commonly employ wavelength selective mirrors and filters to separate several selected wavelengths present in light from a source into component beams. The intensities of the component beams of selected wavelengths are separately modulated so as to control the individual intensity of each beam in accordance with, for example, signals representative of color information. The component beams are then recombined with additional optical mirrors or other such apparatus and deflected by well known scanning means or otherwise directed by mechanical optical devices to produce an information recording or display. The recordings and displays formed frequently suffer misregistration of the plurality of component beams due to physical variations in the many optical mirrors and other mechanical elements required.

Prior art devices and methods for projection or printing photographic pictures frequently use negative or positive transparencies which are illuminated so as to project the images contained therein onto photosensitive paper. The photographic materials used should be carefully matched to each other in order to provide proper color balance, contrast and color separation in the pictures printed. Sometimes the paper is exposed from the face of a cathode ray tube. The low intensity light output from the phosphors in these tubes means relatively long exposure times are needed which results in a relatively slow printing process in comparison with the printing process of the instant invention.

In accordance with the present invention, there is provided an apparatus and method of acoustooptically producing a composite output beam comprising a plurality of diffracted collinear component beams of selected wavelengths which are each independently intensity modulated. Light containing several wavelengths is brought to operably impinge upon an acoustooptic cell. Electrical signals of different fixed frequencies are generated which correspond in number to the plurality of wavelengths selected for the output beam. The amplitudes of these electrical signals are independently modulated in accordance with a source of color information such as a color transparency. The electrical signals are combined to form a composite signal which is applied to an electrical-to-acoustical transducer operatively attached to the cell such that acoustic waves are generated within the cell which correspond to the individual fixed frequencies present in the composite electrical signal. The acoustic waves in the cell cause the light impinging thereon to be diffracted in a plurality of spectrums containing the wavelengths present in the impinging light, the spectrums corresponding in number to the fixed frequency signals applied to the transducer. The frequencies of the electrical signals are chosen so as to produce a composite output beam comprising collinear diffracted component beams of selected wavelengths. The intensities of every component beam is modulated in accordance with the amplitude of the electrical signal responsible for that beam. Thus, there is produced a composite output beam comprising a plurality of intensity modulated component beams of selected wavelengths. The modulated output beam is scanned to record or display information. The impinging light cam comprise a multi-wavelength beam; two different wavelengths can be collinear and the third noncollinear to the two; or the light can comprise beams of different wavelengths all impinging at different angles on the face of the cell. The angles of impingement and electrical frequencies used are mutually dependent as will be explained hereinbelow.

Since in practicing the invention, a plurality of beams with mechanical optical elements are not separated and subsequently recombined, more light passes through the optical system of the invention than in prior art systems. This provides for greater exposure in less time of, for example, photographic material. The system of the invention virtually eliminates misregistration of the individual component output beams which is a problem in prior art systems due to variations in optical mirrors and other mechanical elements.

In accordance with one embodiment of the invention, improvements in image quality of photographic prints are realized by optically scanning photographic storage mediums point by point, electronically processing the color information contained therein, and then recording the result point by point onto photographic paper. This scanning process provides for image enhancement by electric correction of the color information which results in better and more consistent color prints, eliminating the need for as perfect as possible matching of photographic spectral sensitivity in order to produce high quality prints.

Too, in accordance with the invention, a laser light source comprising a single multiple-wavelength laser, a combination of single-wavelength and multiple-wavelength lasers or a plurality of single-wavelength lasers is utilized rather than the cathode ray tube of many prior art photographic printing scanning systems. This enables shorter exposure times because of the greater light intensity available from lasers. Therefore, the embodiment of the invention for printing pictures provides faster printing rates than had previously been possible.

One object of the present invention is to provide an apparatus and method for separately and independently modulating a plurality of wavelengths in light beams impinging upon an acoustooptic cell so as to produce an output beam comprising collinear diffracted beams of wavelengths selected from those present in the input beams.

Another object of the present invention is to provide an improved apparatus and method for color display and recording such as television and photographic color picture printing.

Yet another object of the present invention is to provide an improved television-to-film recording apparatus and method.

Still another object of the present invention is to provide an apparatus and method for photographic color printing wherein the color balance of the resultant print is manually or automatically controlled.

Yet another object of the present invention is to provide an apparatus and method for color picture recording and printing wherein color masking and contrast corrections are made while printing onto photographic paper from either positive or negative transparencies or reflection prints.

One advantage of the apparatus and method of the invention is that registration difficulties inherent in prior art devices are overcome.

Yet another advantage of the instant invention is that the apparatus and method thereof provide for higher speed color photographic printing with improved color balance control.

Still another advantage of the present invention is that the apparatus utilized in accordance therewith is less expensive than that of prior art devices.

Still other objects and advantages of the present invention will become readily apparent to those skilled in the art from the following description with reference to the drawings in which like characters denote like parts and wherein:

FIG. 1 schematically shows in accordance with one embodiment of the invention, a multi-wavelength laser beam impinging upon an acoustooptic cell;

FIG. 2 schematically shows an alternative for the embodiment of FIG. 1 wherein a plurality of laser beams of different wavelengths impinge upon the acoustic cell at different angles from one another;

FIG. 3 shows yet another alternative embodiment to that of FIGS. 1 and 2 wherein two of the impinging beams are collinear and the other is noncollinear with the two;

FIG. 4 schematically shows in accordance with the invention a laser scanning system for printing onto color sensitive photographic recording material;

Figure 7:
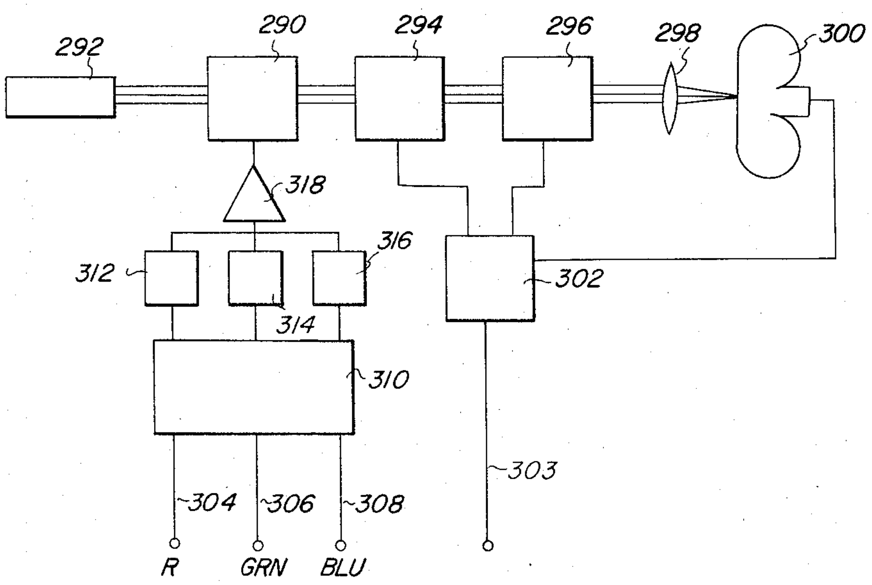
Figure 7A:
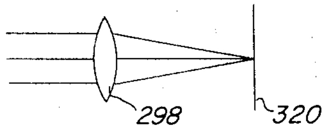
Figure 8:
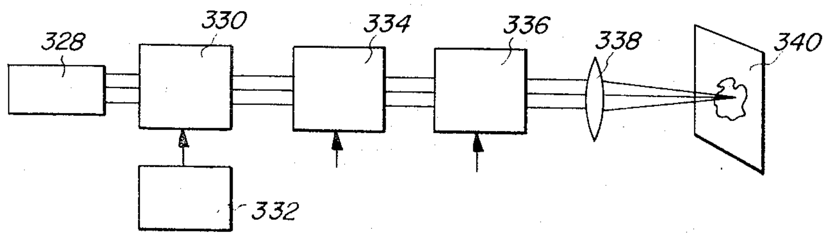
Figure 9:
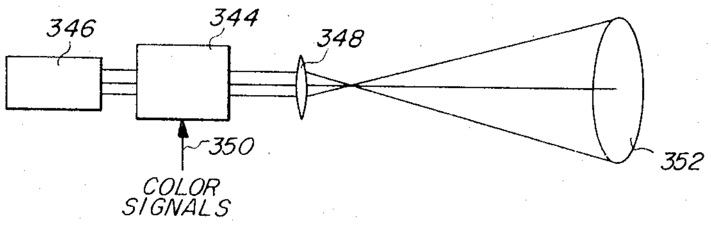

FIG. 7 and 7*a* show a video-to-film recording and display system respectively in accordance with the present invention;

FIG. 8 shows a scanning display system in accordance with the invention;

FIG. 9 shows stationary display system; and

Figure 10:
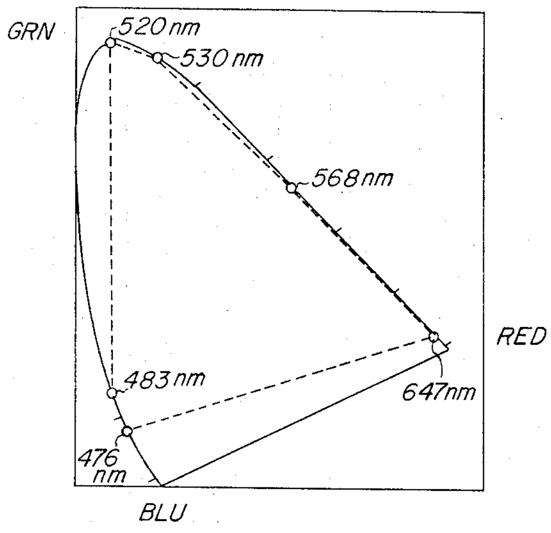

FIG. 10 shows a chromaticity curve for lasers utilized in accordance with preferred embodiments of the invention.

Before referring the FIGS., a background is best established by supporting acoustooptic theory.

The best equations pertaining to acoustooptic devices are summarized as follows:

$$\text{BRAGG ANGLE APPROXIMATION: } \theta = (\lambda f/v) \quad (1)$$

$$\text{TRANSIT TIME: } \tau = d/v \quad (2)$$

$$\text{SPOT SIZE, GAUSSIAN BEAM: } \alpha = (1.27\lambda/d) \quad (3)$$

In these equations, $\lambda$ is the wavelength of light, $f$ is the acoustic frequency, $v$ is the acoustic velocity, and $d$ is the optical beam diameter. The Bragg angle $\theta$ is measured between the undiffracted and first order beams. The transit time $\tau$ is the time required for one acoustic wavefront to pass through the optical beam. The spot size $\alpha$ defines the full angular diameter of a focused Gaussian beam at the $e^{-2}$ intensity points.

An acoustooptic cell with a single-frequency acoustic wave present behaves as an optical phase grating. An incident optical beam consisting of three different wavelengths (e.g. red, green and blue) will be diffracted into the first order according to equation (1). Since its wavelength is greater, the red beam is diffracted at greater angle than the blue.

At low diffraction efficiencies, the acoustooptic cell behaves as a linear device; i.e. the diffracted light intensity is linearly proportional to the input acoustic power. Thus, the superposition principle applies and multiple-frequency inputs will produce multiple diffracted beams. Applying this characteristic, when three frequencies are impressed on the acoustooptic cell, three independent arrays of red, green and blue beams are diffracted.

The three frequencies are selected such that one red, one green and one blue beam from each group are collinear. The amplitude of each frequency component thus controls the intensity of the respective wavelength in the colinear beam. This results in an effective and simple method for simultaneously intensity modulating three collinear optical beams to provide an output comprising three independently modulated collinear beams.

For the case of many wavelengths in the incident optical beam, we can rewrite equation (1) as follows:

$$\theta_{ij} = (\lambda_i f_j/v) \qquad i = 1,2,3...m \qquad j = 1,2,3...n \quad (4)$$

Here, each subscript i refers to a beam of a particular wavelength, and each subscript $j$ refers to the frequency of $t$, the sinusoid that diffracts a desired wavelength. This equation represents an array of ($m \times n$) diffracted beams, of which $n$ are desired.

In the simplest case where $m$ and $n$ are 3, as in a three-color system, nine diffracted beams are produced. To obtain the desired condition of three collinear beams, $$\theta_{11} = \theta_{22} = \theta_{33}\ , \quad (5)$$

and thus $f_1\lambda_1 = f_2\lambda_2 = f_3\mu_3$ .

In practice, the middle frequency $f_2$ is selected first. Then, the other frequencies and angles are determined:

$$f_j = (\lambda_2 f_2/\lambda_j) \quad (6)$$

$$\theta_{ij} = (\lambda_i/v_j)\ \lambda_2 f_2 = (\lambda_i/\lambda_j)\ \theta_{22} \quad (7)$$

These relations give $\theta_{ij}$ and $f_j$ in terms of $f_2$ and $\lambda_j$ for a three color system.

Assuming that $f_1 < f_2 < f_3$; equivalently, the subscripts 1, 2 and 3 correspond to red, green and blue, respectively. The required acoustooptic cell bandwidth is $$\Delta f = |f_3 - f_1| \quad (8)$$

Since $f_3 = (\lambda_2 f_2/\lambda_3)$ and $f_1 = (\lambda_2 f_2/\lambda_1)$, $$\Delta f = \lambda_2 f_2\ |(1/\lambda_3) - (1/\lambda_1)|\ . \quad (9)$$

A blocking aperture is provided to eliminate unwanted diffracted and undiffracted beams. The aperture opening is positioned to pass only beams at the desired angle $\theta_{22}$. Furthermore, a lens is used to form diffraction-limited spots at this aperture. Since adjacent spots should not overlap the aperture, there exists a minimum optical beam diameter d which will satisfy this requirement. Consider the angular differences between $\theta_{22}$ and angles immediately adjacent:

$$\delta\ \theta = |\theta_{22} - \theta_{2,2\pm1}| = \lambda_2/v\ |f_2 - f_{2\pm1}|\ . \quad (10)$$

There are two possible values for $\delta\ \theta$; the smallest value is selected and equated to the angular spot size given by equation (3). In calculating (3) for this case, the largest (red) wavelength should be used. Then, the minimum optical beam diameter is $$d = (1.27\lambda_1/\delta\ \theta) \quad (11)$$

Note that if there are more than three wavelengths present, there will be more than two possible values for $\delta\ \theta$.

Since d has been determined, the transit time given in equation (2) has also been determined. This time is related to the modulation bandwidth possible with an acoustooptic device. It has been shown that the modulation transfer characteristic of an acoustooptic device is $$\exp\ [-(f/f_e)^2]\ , \quad (12)$$

where $f_e = (2\ \sqrt{2}v/\pi d) = 0.9/\tau$ .

When $f = f_e$, the response is down to 36.8 percent from a maximum of 100 percent. When $f = 0.83 f_e \approx 0.75/\tau$, the response is down to 50 percent of maximum. Denoting this 50 percent bandwidth as $\delta f$, the maximum optical beam diameter is, from (2), $$d = (0.75 v/\delta f) \quad (13)$$

Thus, it can be seen that:

a. The modulation bandwidth required establishes the maximum optical beam diameter.

b. This diameter in turn determines the critical angular beam separation $\delta\ \theta$.

c. From $\delta\ \theta$, equations (10) and (4) determine the operating frequencies, given the acoustic velocity and optical wavelengths.

d. The required acoustooptic cell bandwidth is determined by (9).

Calculation Example

A sample calculation of operating conditions is as follows for a krypton ion laser light source with the following average wavelengths:

$\lambda_1 = 647$ nm (red)
$\lambda_2 = 568$ mn (yellow)
$\lambda_3 = 525$ nm (green)
$\lambda_4 = 480$ nm (blue)

The green and blue wavelengths shown are the average of several closely-spaced lines. The laser is used with a glass acoustooptic cell with a sound velocity of $4 \times 10^5$ cm $sec^{-1}$ and a center frequency of 40 MHz such as the Zenith M-4OR. Since there are four wavelengths, equation (4) now becomes $$\theta_{ij} = (\lambda_i f_j/v),\ i = 1,2,3,4. \quad j = 1,2,3.$$

The angle $\theta_{32}$ is selected as the center beam, with which $\theta_{11}$ and $\theta_{43}$ must be made coincident.

$\theta_{32}$ is calculated as $$\theta_{32} = [(5.25\times10^{-5}\text{cm})\ (4\times10^7\text{Hz})/(4\times10^5\ \text{cm sec}^{116\ 1})] = 5.25\ \text{mr}.$$

The remaining angles are calculated in a manner analogous to equation (7). The results are as follows:

| $\lambda_i$ | $\theta_{ij}$ | $\theta_{i1}$ | $\theta_{i2}$ | $\theta_{i3}$ |
|---|---|---|---|---|
| | $\lambda_1$ | 5.25 mr | 6.47 | 7.07 |
| | $\lambda_2$ | 4.61 | 5.68 | 6.21 |
| | $\lambda_3$ | 4.26 | 5.25 | 5.74 |
| | $\lambda_4$ | 3.90 | 4.80 | 5.25 |

The circled values are the desired collinear output beams.

The acoustooptic cell bandwidth is calculated from equation (8) or (9) as 11.3 MHz. The three input frequencies are 32.5, 40.0 and 43.8 MHz.

From an equation analogous to (10), four possible values for $\delta\ \theta$:

$|\theta_{11} - \theta_{21}| = 0.64$ mr
$|\theta_{32} - \theta_{22}| = 0.43$
$|\theta_{32} - \theta_{42}| = 0.45$
$|\theta_{43} - \theta_{33}| = 0.49$ Of these, the smallest value is 0.43 mr.

The optical beam diameter from (11) is calculated as 1.9 mm. The transit time is calculated from (2) as 0.48 $\mu$ seconds. The modulation bandwidth to the 50 percent points is thus 1.5 MHz. typical Reference is now made to FIG. 1. Shown therein is an acoustooptic cell 20 which is a device well known to those skilled in the art. Cell 20 can comprise, for example, plastic, glass, or water where acoustic frequencies up to about 50 MHz are utilized. Lead molybdate ($PbMoO_4$) and quartz are tupical materials for higher acoustic frequencies such as those within the range of 1,000 MHz. The modulation bandwidth of acoustooptic cells when utilized as color modulators is approximately proportional to the acoustic frequency. For example, with a krypton ion laser as a source, a glass acoustooptic cell operating at acoustic frequencies near 50MHz typically has a modulation bandwidth of approximately 1 MHz. A lead molybdate cell operating at about 500 MHz generally has a bandwidth of about 10 MHz. The cell 20 can comprise other substances, the acoustic properties of which are well known to those skilled in the art. Several substances are commercially available.

Incident on surface 22 of cell 20 is a multicolor laser beam 24 comprising three wavelengths. Other wavelengths can be present and other numbers of wavelengths can be selected for use in accordance with the invention. Throughout the specifications, the wavelengths or colors selected for purposes of illustration will be designated red, green and blue. It will be appreciated that other colors or wavelengths can be used in practicing the invention and the invention is not limited to the use of these illustrative wavelengths or colors or even to the use of three wavelengths or colors. Attached to cell 20 is transducer 26 which converts electrical signals produced by generators 28, 30 and 32 as passed by summing amplifier 33 into acoustic waves represented by lines 34 in cell 20. Signal generators 28, 30 and 32 are independently modulated and controlled, either automatically or manually. Passing from cell 20 is beam 24' which is the undiffracted portion of incident beam 24. Diffracted by cell 20 are beams 36, 38, 40 and 42 which are representative of the diffracted beams. It will be appreciated that not all the diffracted beams are shown for purposes of clarity but that every frequency component diffracts every one of the wavelengths present in the impinging beam at a different angle. Thus, the number of diffracted beams equals the number of frequencies applied times the number of wavelengths present in the incident beam. A focusing means represented by lens 44 is also shown. A mask 46 having an aperture blocks the images formed by lens 44 which do not pass through the aperture. Such images are those from beams 38, 40 and 42 shown as spots 48, 50 and 52, respectively. Passing through the aperture of mask 46 is composite output beam 36 which comprises collinear diffracted component beams of selected wavelengths.

Figure 2:
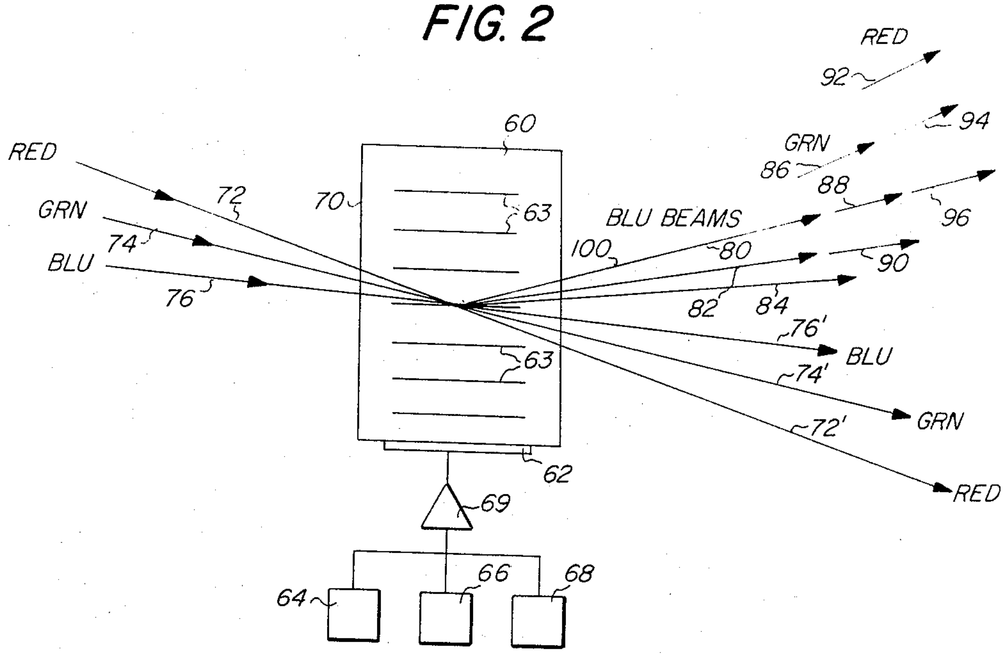

Turning now to FIG. 2, shown therein is an acoustooptic cell 60 having an acoustic transducer 62 attached thereon. Three independently controlled variable amplitude signal generators 64, 66 and 68 provide electrical signals which are summed by summing amplifier 69 amd applied to transducer 62 which produces a composite acoustic wave 63 in response thereto. Incident on side 70 of cell 60 are three laser beams 72, 74 and 76 impinging upon cell 60 at three different angles. Beams 72, 74 and 76 contain, for example, red, green and blue wavelengths of light, respectively. Transmitted through cell 60 are undiffracted beams 72', 74' and 76'. Diffracted by cell 60 are beams for each of the applied frequencies; 80, 82 and 84 from the blue beam 76; 86, 88 and 90 from green beam 74; and 92, 94 and 96 from the red beam 72. Composite output beam 100 comprises beam 80 of the diffracted blue beams, beam 88 of the diffracted green beams and beam 96 of the diffracted red beams. The output angles for the diffracted beams are functions of the frequencies of the signals applied to the acoustooptic cell. These frequencies are chosen to produce the composite beam 100. It will be appreciated that other combinations of diffracted beams can be selected. The amplitudes of the collinear component beams 96, 88 and 80 are individually controlled by amplitude modulating the outputs of the signal generators 64, 66 and 68, respectively.

Figure 3:
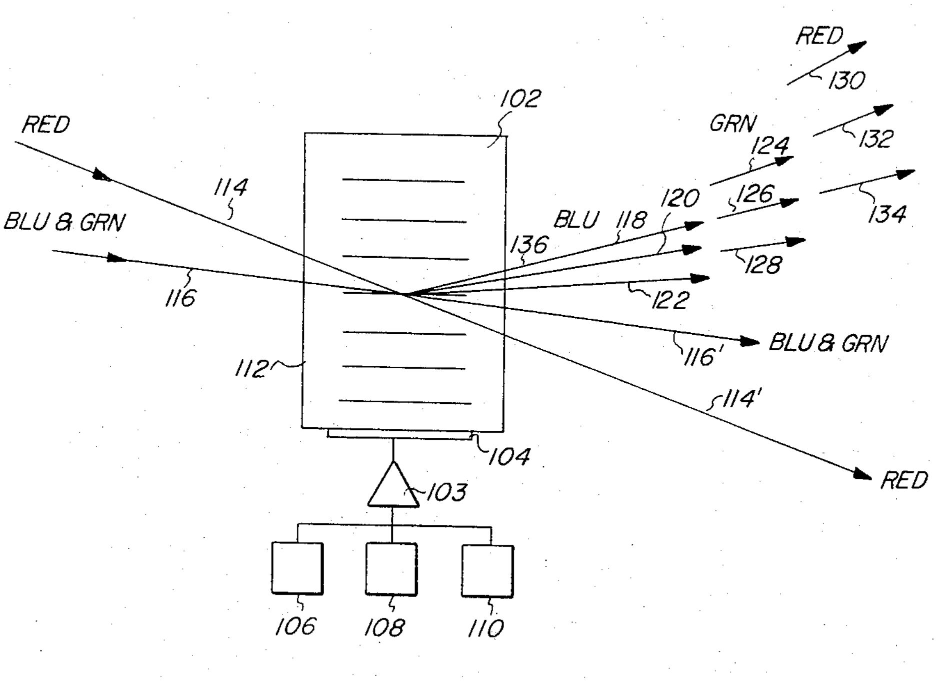

Reference is now made to FIG. 3 wherein is shown an acoustooptic cell 102 which is controlled with transducer 104 and three independently amplitude modulated fixed frequency signal generators 106, 108, and 110 outputting through summing amplifier 103. Incident on surface 112 of cell 102 are red laser beam 114 and a combination blue and green laser beam 116. It will be understood that other combinations of light wavelengths in the collinear beam can be utilized in accordance with the invention. Passing through cell 102 are the undiffracted portions of the blue-green beam 116' and the red beam 114'. Diffracted by cell 102 are blue beams 118, 120, and 122; green beams 124, 126, and 128 and red beams 130, 132, and 134. The frequencies of the signals produced by sources 106, 108, and 110 are such that blue beam 118, green beam 126, and red beam 134 are collinear and hence from composite beam 136. As with reference to FIGS. 1 and 2, the amplitudes of the signals generated by 106, 108, and 110 are modulated to control the intensities of the collinear component beams 134, 126 and 118, respectively, in the composite output beam 136.

Figure 1:
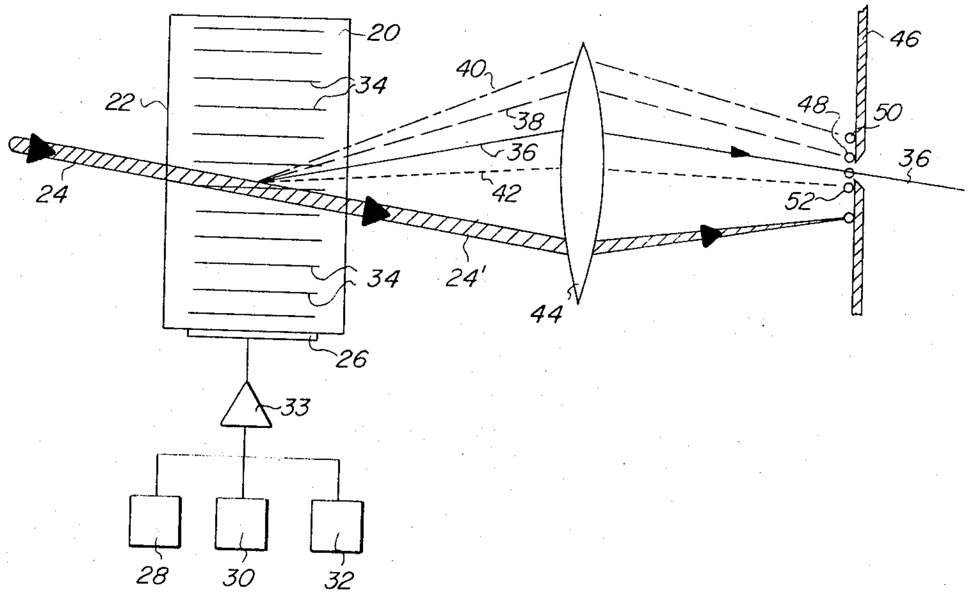

In practicing the invention using the FIG. 1–3 embodiments, three electrical signals are generated by corresponding signal generating devices. Each signal has a frequency responsible for an acoustic wave produced by the transducer attached to the cell. Separate transducers can also be used for each frequency or two transducers can be used, one handling two frequencies and the second a single frequency. Other combinations and permutations of transducer and applied frequencies will be apparent to those skilled in the art. The single generated by each generator is amplitude modulated in accordance with the color information associated with that generator to be recorded or displayed in order to balance properly the intensities of the collinear diffracted red, green, and blue component beams. The signals are preferably electrically combined and amplified by a summing amplifier before they are applied to the acoustic transducer which converts them into acoustic waves within the cell. For a given desired angle of diffraction in the embodiment of FIG. 1, the frequencies of the acoustic waves are selected to be inversely proportional to their corresponding component light wavelengths as specifically pointed out in the theory above appearing. More discussion of the theory in acoustooptic phenomena appears in the above-mentioned U.S. Application Ser. No. 132,955 filed April 12, 1971 to the inventor herein, Richard A. Spaulding and another, Royce D. Pickering.

Theory shows that the angle through which any beam is diffracted in dependent on the frequency of the acoustic wave causing the diffraction and not the amplitude of the acoustic wave. Thus, by modulating the amplitude of the applied electrical signal and thereby the acoustic wave, the intensity of the light diffracted can be controlled without affecting the direction the diffracted beam takes. This is because the angle of diffraction is not affected by amplitude changes in the acoustic wave.

The amperture in mask 46 of FIG. 1 is chosen to be approximately the size of the diffraction limited spot produced by the longest wavelength optical component in the impinging beam 24. Similar masks are used to block unwanted beams in the embodiments of FIGS. 2 and 3. Which diffracted beam of any particular wavelength is utilized in forming the composite beam is a matter of frequency selection.

Figure 4:
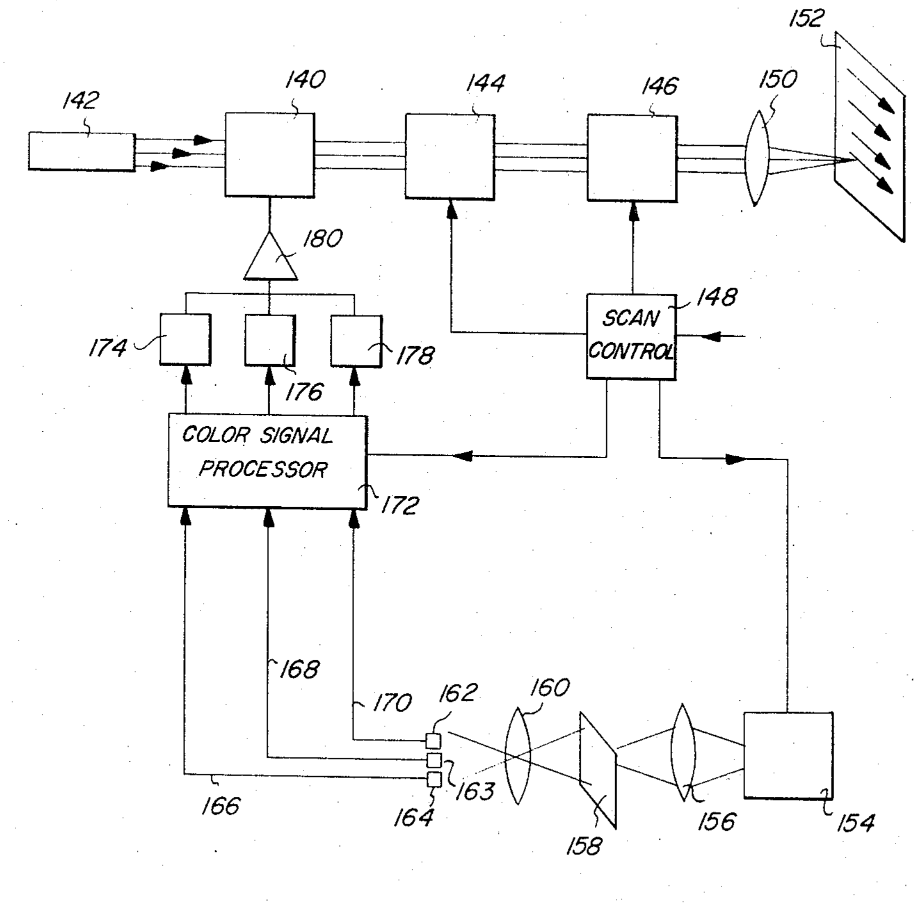

Reference is now made to FIG. 4 wherein, in accordance with the invention, an apparatus and method for printing onto color sensitive photographic paper or other such color sensitive material is shown. Acoustooptic color modulator 140 receives a plurality of wavelengths, e.g., red, green and blue, from a multiwavelength laser source 142. The laser source 142-acoustooptic modulator 149 combination can comprise any one of the embodiments shown in FIGS. 1, 2 and 3. Horizontal mirror scanner 144 and vertical mirror scanner 146 are controlled by a scan control unit 148. The scan control unit 148 can be any one of several well known devices, the complexity of which runs from simple mechanical gear drives to complex digital computer controlled systems. The choice for a particular application will depend upon the complexity of the task and upon whether or not color compensation (discussed hereinbelow) is desired in the finished product and other such factors. Lens 150 schematically represents a focusing system which focuses the scanning beam onto the photographic paper 152 for recording an image thereon. Other optical elements such as lenses and mirrors optically coupling elements 140, 142, 144, 146 and 150 are not shown for purposes of clarity, but are well known to those skilled in the art. Scan control 148 also controls a scanning light source 154 which images a beam through an optical system represented schematically by lens 156 through a negative or a positive transparency 158. The light beam modulated by negative or positive transparency 158 is focused by an optical system represented by lens 160 onto photosensors 162, 163, and 164 which are each photosensitive to a different one of the selected wavelengths, e.g., red, green, or blue. The red, green, and blue wavelengths present in the light falling onto photosensors 162, 163, and 164 activate these photosensors to produce electrical signals representative of the red, green, and blue information in the transparency 158. Electrical signals produced by the photosensors are carried by lines 166, 168, and 170 to a color signal processor 172 which is synchronized with the scanning of the negative or positive transparency and the acoustooptic modulator 140 by scan control unit 148. Color signal processor 172 controls the amplitudes of the output of signal generators or oscillators 174, 176, and 178. The amplitudes of the signals generated by oscillators 174, 176, and 178 are therefore varied by color signal processor 172 in accordance with the relative intensities of the color components of the point being scanned on transparency 158 at any one point in time. The processor output is adapted to whether a negative or positive transparency 158 is being used. The outputs of oscillators 174, 176, and 178 are fed to a summing amplifier 180 which applies the signals amplified thereby to the transducer(s) mounted on the acoustooptic cell of acoustooptic modulator 140.

In operation, scan control unit 148 is activated so as to control the scan of the light source 154, mirrors 144 and 146, and color signal processor 172 by a control information input. Scanning light source 154 which is preferably a laser source, can be a separate source of light or can utilize part of the light from source 142 as will be discussed hereinbelow with reference to FIG. 6. In any event, light from source 154 scans negative or positive transparency 158. Transparency 158 modulates the selected wavelengths in the beam in accordance with the colors within the spot being scanned on the transparency. Photosensors 162, 163 and 164 pick up the amount of any color component in the spot being scanned in transparency 158 and transmit electrical signals representative thereof through lines 166, 168 and 170 to color signal processor 172. Color signal processor 172 is adapted for use with negative or positive transparencies and controls the amplitudes of the signals generated by the oscillators 174, 176 and 178 in accordance with the transmittance for each color component in the spot being scanned in the transparency at that point in time. The oscillators 174, 176 and 178 as amplitude modulated by processor 172 output through summing amplifier 180 to acoustooptic modulator 140 to control the intensities of the red, green and blue diffracted collinear component beams produced by the acoustooptic modulator. The composite output beam comprising the collinear intensity modulated component beams is scanned by horizontal mirror scanner 144 and vertical mirror scanner 146 and imaged by lens 150 onto photographic paper 152 to record an image representative of the image in the positive transparency 158, or of the positive of the negative transparency image if a negative transparency is utilized. The scanning source 154 can be a cathode ray tube, i.e., a flying spot scanner, as well as the preferred laser source. Transparency 158 can also be scanned utilizing the same mirrors which effect the horizontal and vertical scan of the photographic paper 152, i.e., 144 and 146, as seen with reference to FIG. 6.

Figure 5:
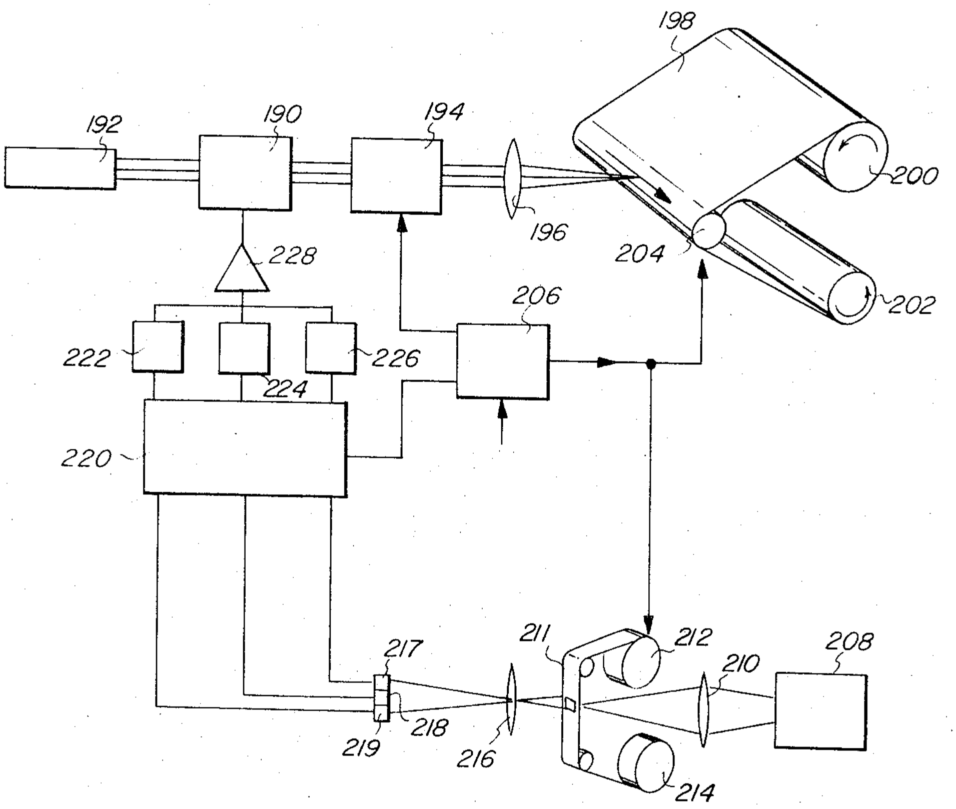
FIG. 5 shows a variation of the system of FIG. 4 for printing onto color sensitive photographic recording material.

Turning now to FIG. 5, shown therein is another embodiment of a laser printing apparatus and method, this one using roll photographic recording paper. Acoustooptic modulator 190 processes the beam from a multi-wavelength laser source 192 which preferably comprises any of the embodiments of FIGS. 1, 2 or 3. Horizontal scanning mirror 194 scans the diffracted composite output beam of modulator 190 through an optical system schematically represented by lens 196 onto constant-speed roller driven photographic paper 198. Supply reel 200 and take-up reel 202 in combination with constant speed drive roller 204 provide a constant speed past the scanning beam for the continuous belt of photographic paper 198. Drive and scan control unit 206 controls horizontal scanning mirror 194 and constant speed drive roller 204. An optical scanner 208 through an optical system schematically represented by lens 210 scans positive or negative transparencies in roll form 211 mounted on supply reel 212 and take-up reel 214. Drive and scanning control 206 controls the drive and take-up reels 212 and 214 so as to synchronize the movement of the transparencies on roll 211 with the movement of the photographic paper 198. An output optical system schematically represented by lens 216 focuses the light from the transparencies as scanned onto red, green, and blue photosensors 217, 218 and 219. Electrical signals produced by red, green and blue photosensors 217, 218 and 219 are fed to color signal processor 220 wherein they are used to control signal generators 222, 224 and 226. As passed through summing amplifier 228, the signal provided by generators 222, 224 and 226 are fed to acoustooptic modulator 190 which intensity modulates the selected wavelengths in the composite beam transmitted therefrom. This is accomplished by drive and scan control 206 synchronizing the color signal processor 220 to amplitude modulate fixed-frequency oscillators 222, 224 and 226 with the scans of the transparencies on roll 211 and photographic paper 198.

It will be appreciated that the operation of the printing system of FIG. 5 is similar to that of FIG. 4 except that the FIG. 5 embodiment uses no vertical mirror scanner. The paper motion provides a constant presentation of fresh photographic paper synchronized with the movement of the transparencies in roll form.

Figure 6:
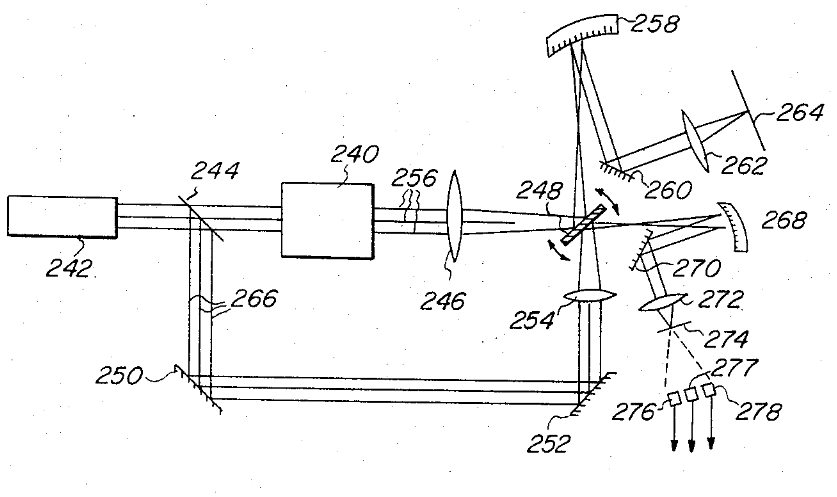
FIG. 6 shows a schematic representation of a color image recording apparatus in accordance with the invention wherein the same laser source is used to scan the color transparency and the color sensitive photographic recording material.

Reference is now made to FIG. 6. Shown therein is an apparatus and method for utilizing the same scanning mirror for reading the transparency and printing on the photographic paper. Acoustooptic modulator 240 receives input light from a multi-wavelength laser beam generated by laser source 242. The laser-modulator combination preferably comprises one of the embodiments shown in FIGS. 1, 2 and 3. Between laser source 242 and modulator 240 is disposed a beam splitter, 244, which splits the beam from source 242 into two multi-wavelength components. One of the multi-wavelengths component beams, 256, passes through the beam splitter 244 and goes through acoustooptic modulator 240. Modulated beam 256 then passes through an optical focusing arrangement represented schematically by lens 246 to a rotating two-sided scanning mirror 248. Bean 256 is reflected from mirror 248, being given scanning motion thereby, onto mirror 258 and then onto a mirror 260. It then passes through lens 262 to arrive at photographic paper 264. The other portion of the beam from laser source 242, designated 266, is reflected from mirror 250 onto mirror 252 and then through an optical system represented by lens 254 onto rotating mirror 248. Beam 266 is reflected and given scanning motion by rotating mirror 248 which reflects the beam onto mirror 268, from where it is reflected onto mirror 270. From mirror 270, the beam is passed through an optical system schematically represented by lens 272 and then through transparency 274 where the beam is modulated by the image contained therein. Light beam 266, now modulated by transparency 274 impinges upon photosensors 276, 277 and 278 which are reponsive to the red, green and blue component portions thereof, respectively. Electrical signals produced by photosensors 276, 277 and 278 are representative of the intensities of the component colors of light impinging thereon and are sent to a color signal processor such as 220 shown in FIG. 5.

In the arrangement shown by FIG. 6, light from the same source 242 is used to scan both the transparency 274 and the photographic paper 264. Synchronization is inherent in such a system since mirror 248 supplies the rate of scan for both the image scanned from the transparency and the image recorded on the paper. Prisms or other light deflecting elements can be substituted for any or all mirrors 250, 252, 260 and 270 to more efficiently utilize the light available. This system provides 1-dimensionsal scanning motion, while paper motion provides the other scan dimension as in the embodiment shown in FIG. 5.

Alternatively, the transparency can be replaced by a color reflection print, and the red, green and blue signals sensed by reflection instead of transmission.

Figure 6A:
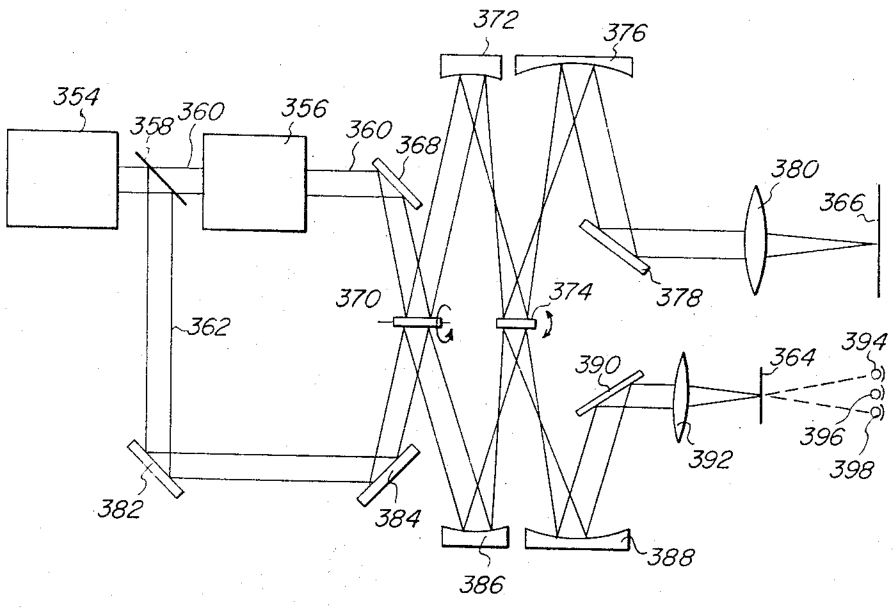
FIG. 6A shows a two-axis scanner for printing from color transparencies onto color sensitive photographic recording material.

FIG. 6*a* shows a 2-axis mirror sensor using the same mirror for horizontal and vertical scanning of transparency and paper.

The multi-wavelength light source 354-acoustooptic modulator 356 combination can once again be any of the embodiments shown in FIGS. 1–3. Disposed between source 354 and modulator 356 is beam splitter 358 which divides the beam from source 354 into two portions. One portion, 360, is optically processed by modulator 356 whereas portion 362 is not. Beam portion 360 is used to record onto photographic paper 366 and beam portion 362 is used to read the image within transparency 364. Mirror 368 reflects beam 360 onto two-sided mirror 370 which rotates in a first direction shown herein to be about an axis in the plane of the paper. The mirror 370 gives the beam 360 a first of "X" direction of scanning motion and reflects it onto mirror 372 which reflects it onto two-sided mirror 374 rotating in a "Y" direction about an axis substantially perpendicular or otherwise disposed in relation to the axis of rotation of mirror 370 and shown herein as an axis perpendicular to the plane of the paper. Bean 360, now having "X" and "Y" scanning motion is reflected from mirrors 376 and 378 and passed through an optical focusing device schematically represented by lens 380 which focuses beam 360 onto photographic paper 366 to record the image from transparency 364 thereon. At the same time, beam 362 is reflected from mirrors 382 and 384 onto rotating mirror 370, mirror 386 and rotating mirror 374 to give it an "X-Y" scanning motion inherently synchronized with the scan of beam 360. Beam 362 is additionally routed by mirrors 388 and 390 through a focusing device schematically represented by lens 392. Lens 392 focuses beam 362 onto transparency 364, the beam passing therethrough and modulated thereby impinging on photosensors 394, 396 and 398 which are each sensitive to a different component color. Photosensors 394, 396 and 398 produce electrical signals representative of the color information in the transparency. The signals are processed in a fashion similar to that shown in FIG. 4 to reproduce the image of transparency 364 on paper 366.

Figure 6B:
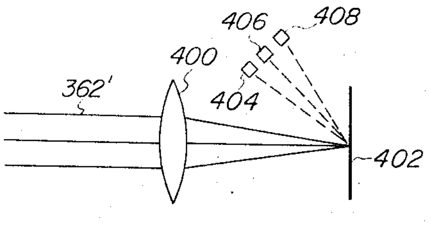
FIG. 6B shows a manner of reading color information from reflection color prints.

Reflectance prints can also be used when the embodiments of the invention shown in FIGS. 4–6 are adapted thereto. Such an adaption is illustrated in FIG. 6*b* wherein a beam such as 362′ corresponding to beam 362 of FIG. 6*a* is passed through lens 400 onto reflectance print 402 which reflects light modulated according to the color information thereon. Some of the reflected light is received by photosensors 404, 406, 408 which produce electrical signals in accordance therewith to be processed as disclosed with reference to FIGS. 4–6*a*.

Turning now to FIG. 7, a video-to-film recorder in accordance with the invention is shown. The acoustooptic modulator 290-multi-wavelength laser source 292 combination preferably comprises any one of the embodiments shown in FIGS. 1, 2, and 3. The composite intensity modulated output beam of modulator 290 is passed through horizontal mirror scanner 294 and vertical mirror scanner 296. The scanned beam is transmitted by an optical system represented by lens 298 onto the input of a television-film recording camera 300. Such cameras are well known to those skilled in the art and no detailed disclosure thereof is made herein. It is well known that frame rate conversion from television which has a rate of 30 frames per second to conventional motion pictures which have frame rates of 24 frames per second is accomplished with such standard television film recording cameras. Scan control 302 synchronizes horizontal mirror scanner 294, vertical mirror scanner 296 and camera 300 from a picture synchronization signal input 303. Decoded color video signals from magnetic or video tape, broadcast television, closed circuit television, or other such source are passed through red, green and blue signal input lines 304, 306, and 308 to color signal processor 310 which controls the acoustooptic modulator 290. The conversion takes place in processor 310 in a manner similar to those of the aforementioned embodiments of FIGS. 4 and 5 with the color signal processor 310 controlling the intensities of the selected wavelength component beams in the composite beam produced by modulator 290. This is accomplished by modulating the amplitudes of the outputs of fixed frequency oscillators 312, 314, and 316 which are passed by summing amplifier 318 to the transducer (not shown) of the acoustooptic modulator 290. The decoded red, green, and blue video information coming in on lines 304, 306, and 308 is preferably adjusted by processor 310 to compensate for film characteristics, color balance, and color masking. Typically in this embodiment, the acoustooptic modulator 290 comprises lead molybdate as the interaction medium in combination with a 500 MHz. thin-film transducer which yields a video modulation bandwidth of about 10 MHz. Horizontal scanner 294 is preferably a high speed rotating mirror synchronized to the horizontal synchronization signal in the video waveform although other scanning means can be employed as scanner 294. Vertical mirror scanner 296 is preferably a galvanometer driven mirror synchronized to the vertical synchronization signal. In this manner, selected forms of the television picture are recorded frame by frame on the motion picture film in camera 300.

The television recording system described with reference to FIG. 7 can be also used as a television projection display by substituting a projection screen 320 as seen in FIG. 7*a* for camera 300, screen 320 receiving light from lens 298. The high light intensities available from lasers make possible a projection display of high brightness. The color purity from laser light enables highly saturated colors to be reproduced which result in improved visual color balance and contrast of the projected image. Speckle effects which are caused by the inherent coherence of laser light can be eliminated by moving or vibrating the projection screen 320.

FIG. 8 shows a display system comprising a laser source 328-acoustooptic color modulator 330 combination such as that shown in FIGS. 1-3. The color modulation signals are produced by modulated oscillators and a control device combination collectively represented by block 332. The output of source 328 impinges upon acoustooptic modulator 330. The output of the acoustooptic modulator 330 passes through horizontal mirror scanner 334 and vertical mirror scanner 336 into an optical focusing system represented schematically by lens 338 and from there onto a display screen 340 where the display appears. This is a very convenient, simple, and efficient as well as inexpensive way to display color visual information and patterns. The color display can be manually or automatically controlled depending on the control device 322 incorporated into the system to provide a wide range of visual colors projected on the screen 340.

A stationary display is seen with reference to FIG. 9. Acoustooptic modulator 344 receives incident light from laser source 346 and transmits the beams diffracted thereby through an optical system schematically represented by lens 348. The composite output beam from acoustooptic modulator 344 is controlled in color and intensity by the electrical signals applied through line 350. Such a control is similar to those discussed in regard to other embodiments heretofore disclosed. The stationary display is focused on screen 352. One application of the display of FIG. 9 is a device known as a color stimulus generator in which various color sensations are produced to study human color visual response. The laser sources described herein in FIGS. 1-3 are capable of a much greater range of colors then present instruments using optical filters and white light from non-laser sources. A vibrating projection screen can be used to reduce the speckle effect.

With reference to FIG. 10, a C.I.E. standard chromaticity curve is shown having dotted lines enclosing the areas of colors possible with a Krypton-ion laser as the multi color cource. Reference is made to "Principles of Color Photography", by Evans, Hanson and Brewer, Wylie, 1953, page 62. transducers Another application of displays such as those of FIGS. 8 and 9 is in the measuring of the response to photographic materials to various combinations of laser wavelengths. The multi-color acoustooptic modulator offers a simple and reliable means for controlling the relative intensities as well as the durations of exposures due to each of the wavelengths present in the composite beam emerging from the acoustooptic modulator as imaged onto photographic material.

Although the embodiments shown herein were directed to three colors — red, green, and blue; other three-color combinations and, indeed, any number of colors in combination can be utilized in practicing the invention. Too, acoustic waves in the acoustooptic modulators hereinabove described are produced simultaneously by an acoustic transducer in response to three simultaneously applied electric signals from generating sources. Alternatively, three separate acoustic tranducers can be used, each having a signal of different frequency applied. The three transducers can be arranged such that their acoustic waves are coincident at the region which interaction with the light beams takes place, or they can sequentially interact with the incident light beam. Too, the acoustic wave can be a standing wave within the interaction material rather than a traveling wave as disclosed with reference to the embodiment shown herein. Combinations of one transducer handling two or more frequencies with other transducers handling one or more frequencies can also be used.

It will be appreciated that the application of signals of several frequencies into the acoustic transducer to obtain independent diffracted component beams utilizes the linear property of the acoustooptic cell. This linearity is strictly valid for low diffraction efficiencies. When higher amounts of diffracted light are utilized, there may be some interaction between the different frequency components. This can result in a variation of optical intensity or power of one diffracted beam when the intensity of another is varied. Since this amount of error is known to be a function of the intensity of the light diffracted, the error can be corrected by the use of nonlinear electronic circuitry within the color signal processors such as those of FIGS. 4, 5, 7, and 8. Thus, the color signal processors can be adapted to correct for the problem and the acoustooptic cell can be operated at larger diffraction efficiencies to increase the exposure or printing rate for printing on photographic materials or other uses.

Too, the relative diffraction efficiencies vary for the frequencies and wavelengths utilized. In practicing the invention, any desired combination of efficiencies suitable for obtaining sufficient light intensity for each of the components of the composite beam can be utilized. An advantage is realized when one wavelength is diffracted with greater efficiency than the others. For example, greater light intensity of the red beam is possible before nonlinear interactions become apparent. The correction for nonlinear effects can also be implemented by the use of negative feedback techniques, sampling the diffracted light, and correcting the signal produced by the color signal processor to produce an optical intensity which substantially reproduces the input electrical signal.

Many existing scanners can be used to perform in accordance with the schematic representations of FIGS. 4–8, but a particularly well-suited scanner is that disclosed in U.S. Application entitled, "X-Y Optical Scanning System" having Ser. No. 192,452 to Pickering filed October 26, 1971.

The signal generators are also controlled so as to produce types of information other than color scenes with outputs in color code in analog or digital form.

Two or more noncollinear output beams can be produced in accordance with the invention. For example, for interlace scanning or other use a red output beam and a composite output beam consisting collinear blue and green component beams can be formed. Other combinations and permutations will be apparent to those skilled in the art.

The colors scanned from the color information media can be totally different colors than those used to record the scanned information onto the color sensitive photographic recording medium. Also, one or more of the colors for scanning out can be the same as the recording colors and the remaining color(s) can be different.

Although FIGS. 1–3 show laser light beams representative of one, two and three wavelengths, it will be understood that laser sources usually emit more than one wavelength. In accordance with the invention, laser sources are utilized which will, together, produce a composite output beam comprising collinear component beams of selected wavelengths such that significant amounts of overlapping of undesired wavelengths is eliminated. This is done by using lasers strongly emitting at wavelengths which are adequately separated from other strongly emitted wavelengths such that unwanted sufficiently strong wavelengths can be masked.

This invention has been described in detail with particular reference to preferred embodiments thereof, but it will be understood that variations and modifications can be effected within the spirit and scope of the invention.

I claim:

1. An apparatus including an acoustooptic cell for modulating and diffracting light of different wavelengths impinging on said cell onto a composite, collinear output beam of light comprising a selected number of the different wavelengths present in said impinging light, the combination comprising:

- an acoustooptic cell having electrical-to-acoustical transducer means operatively attached thereto;
- means for impinging multi-wavelength light upon said cell;
- means for generating a plurality of electrical signals in accordance with a selected number of collinear output beams, each signal being of a different fixed frequency; and
- means for applying said electrical signals to said transducer means to form acoustic waves in said cell which diffract said light impinging on said cell to form said composite, collinear output beam of light of said selected number of different wavelengths.

2. The invention of claim 1 including means for modulating said electrical signals of different fixed frequency.

3. The invention of claim 1 wherein said modulating means comprises means for independently controlling the amplitudes of said signals of different fixed frequencies.

4. The invention of claim 1 wherein said impinging means comprises a multi-wavelength laser light beam.

5. The invention of claim 1 wherein said impinging means comprises at least two collinear laser light beams of different wavelengths and at least one other laser light beam of another wavelength.

6. An apparatus for recording a color image corresponding to a color image on a storage medium onto color sensitive photographic recording material, said apparatus comprising:

- means for scanning said medium with multi-wavelength light that is modulated in accordance with the color image on said medium;
- photoelectric means for receiving the modulated light and for generating a number of electrical signals, each of which is representative of a different selected wavelength within the modulated light;
- means responsive to said photoelectric means for modulating said electrical signals;
- an acoustooptic cell having electrical-to-acoustical transducer means operatively attached thereto;
- means for impinging multi-wavelength laser light upon said cell;
- means for applying said modulated signals to said transducer means to produce acoustic waves in said cell which diffract said laser light into at least one composite, collinear output beam of said different selected wavelengths; and
- means for scanning said photographic recording material with said composite, collinear output beam of light to record a color image thereon corresponding to the color image on said medium.

7. The invention of claim 6 further comprising means for synchronizing said photographic recording material scanning means with said medium scanning means.

8. An apparatus for recording a color image corresponding to a color image on a positive transparency onto color sensitive photographic recording material, said apparatus comprising:

- means for scanning said transparency with multi-wavelength light that is modulated in accordance with the color image on said transparency;
- photoelectric means for receiving said modulated light and for generating a number of electrical signals of different fixed frequencies, the signals corresponding in number to a selected number of different wavelengths of modulated light;

means responsive to said photoelectric means for modulating said electrical signals;
an acoustooptic cell having electrical-to-acoustical transducer means operatively attached thereto;
means for impinging multi-wavelength laser light upon said cell;
means for applying said modulated electrical signals to said transducer means to produce acoustic waves in said cell which diffract said laser light to form at least one composite, collinear output beam of said different selected wavelengths; and
means for scanning said photographic recording material with said composite, collinear output beam to record a color image thereon corresponding to the color image on said transparency.

9. The invention of claim 8 further comprising means for synchronizing said photographic recording material scanning means with said transparency scanning means.

10. An apparatus for recording a color image corresponding to the positive of a negative image on a color transparency onto color sensitive photographic material, said apparatus comprising:
means for scanning said negative transparency with a multi-wavelength beam of light to modulate the wavelengths thereof in accordance with the image on said negative transparency;
photoelectric means for receiving said modulated beam of light for generating electrical signals of different fixed frequencies in accordance with a number of different selected wavelengths in the modulated beam;
means responsive to said photoelectric means for amplitude modulating said electrical signals;
an acoustooptic cell having electrical-to-acoustical transducer means attached thereto;
means for impinging multi-wavelength laser light upon said cell;
means for applying said modulated electrical signals to said transducer means to produce acoustic waves in said cell which diffract said laser light to form at least one composite, collinear output beam of said different selected wavelengths; and
means for scanning said photographic recording material with said composite, collinear output beam to record a color image thereon corresponding to the positive of the negative image on the transparency.

11. An apparatus for recording a color image corresponding to a color image on an opaque support onto color sensitive photographic recording material, said apparatus comprising:
means for scanning the color image on said support with a multi-wavelength beam of light the light of different wavelengths being reflected by and modulated in accordance with the color image;
photoelectric means for receiving the modulated wavelengths of light for generating electrical signals of different fixed frequencies in accordance with a number of different selected wavelengths present in the reflected light;
means responsive to said photoelectric means for modulating said electrical signals;
an acoustooptic cell having electrical-to-acoustical transducer means operatively attached thereto;
means for impinging multi-color laser light upon said cell;
means for applying said modulated electrical signals to said transducer means to produce acoustic waves in said cell which diffract said laser light to form at least one composite, collinear beam of said different selected wavelengths; and
means for scanning said photographic recording material with said composite, collinear output beam to record a color image thereon corresponding to the color image on said support.

12. An apparatus for recording an image on a color sensitive photographic recording material from color information in a storage medium, said apparatus comprising:
means for directing a multi-wavelength beam of light onto said storage medium to produce a first X-Y scanning beam;
means for receiving the wavelengths of light as modulated by the color information and for converting a number of different selected modulated wavelengths of said light into electrical signals, each of which is modulated by a signal of different fixed frequency;
means responsive to said multi-wavelength beam of light and to said electrical signals for producing a second X-Y scanning beam comprising a group of different selected wavelengths of light corresponding in number to the number of different selected wavelengths;
means for synchronizing the second X-Y scanning beam with the first X-Y scanning beam; and
means for exposing said photographic recording material with said second X-Y scanning beam to record an image thereon representative of the color information derived from said storage medium.

13. The invention of claim 12 wherein said producing means for said second X-Y scanning beam comprises:
an acoustooptic cell having electrical-to-acoustical transducer means operably attached thereto;
means for impinging a multi-wavelength beam of laser light upon said cell; and
means comprising a summing amplifier responsive to said modulated electrical signals and interconnected to said transducer means for producing acoustic waves within the cell which diffract the light beams impinging upon the cell to form a composite, collinear output beam comprising wavelengths of light corresponding to said group of different selected wavelengths.

14. The invention of claim 12 wherein said first and second scanning beams are derived from a common laser source and are coupled to a common synchronizing means.

15. An apparatus for recording a color image corresponding to color information on a color storage medium onto color sensitive photographic recording material, said apparatus comprising:
means for scanning said storage medium with a multi-wavelength beam of light in a single dimension of scan;
means for moving said storage medium in a direction substantially perpendicular to said dimension of scan to produce an effective X-Y scan of the medium;
means responsive to a number of different selected wavelengths of the scanning beam as modulated by said medium for generating a corresponding number of electrical signals, each of said signals being modulated by a single of different fixed frequency;

an acoustooptic cell having electrical-to-acoustical transducer means operably attached thereto;

means for impinging a plurality of laser produced light beams of different wavelengths upon said cell;

means responsive to said modulated electrical signals and interconnected to said transducer means for diffracting said multi-wavelength beam of light to produce a composite, collinear output beam of light comprising said different selected wavelengths;

means for moving said collinear output beam in scanning synchronism with the medium scanning means; and means for exposing said photographic recording material with said collinear output beam to record color images thereon corresponding to the color information on said storage medium.

16. The invention of claim 15 wherein said collinear output beam has a scanning direction corresponding to and synchronized with the scanning direction of said medium scanning beam and the photographic recording material is moved in a direction corresponding to and synchronized with that of said medium.

17. The invention of claim 16 wherein said collinear output beam and medium scanning beams are derived from the same laser source and are responsive to a common synchronizing means.

18. The invention of claim 15 wherein said diffracting means includes:

means for summing the plurality of modulated electrical signals of different fixed frequencies to produce said composite, collinear output beam; and means for varying the amplitudes of said electrical signals of fixed frequencies to control the intensity of said composite, collinear output beam.

19. An apparatus for recording color images corresponding to color information carrying video signals onto motion picture film, said apparatus comprising:

laser source means for producing multi-wavelength light;

means for converting video signals carrying color information to electrical signals of different fixed frequencies which are modulated in accordance with the color information carried by said video signals;

means responsive to said electrical signals for diffracting light from said source means into a composite, collinear output beam comprising a number of different selected wavelengths present in said light;

means for moving said collinear output beam so as to produce an X-Y scanning motion of said beam;

means for synchronizing said X-Y scanning motion with said video signals; and means for exposing motion picture film to said collinear output beam to record images on said film corresponding to said color information.

20. An apparatus for producing a color display comprising:

laser source means for producing multi-wavelength light;

means for generating a selected number of electrical signals of different fixed frequencies and for modulating the signals generated thereby;

acoustooptic means optically coupled with said laser means and responsive to said electrical signals for producing a composite, collinear output beam containing a number of different selected ones of the wavelengths present in the light from said laser means; and means for directing said composite, collinear output bean onto a screen to produce said color display.

21. The invention of claim 20 wherein said beam directing means includes means for scanning said screen with said composite, collinear output beam.

22. A method of producing a composite, collinear beam of light comprising a plurality of different selected wavelengths derived from the wavelengths in one or more laser light sources; the method comprising the steps of:

propagating multi-wavelength laser light;

generating a number of electrical signals of different fixed frequencies;

modulating said signals to provide signals of predetermined intensities; and acoustooptically diffracting said propagated laser light in accordance with said electrical signals to form a composite, collinear output beam comprising a number of different selected wavelengths corresponding in number to said number of electrical signals.

23. The invention of claim 22 wherein propagating laser light comprises propagating a multi-wavelength beam of laser light.

24. The invention of claim 22 wherein propagating laser light comprises propagating at least two wavelengths of laser light.

25. A method for recording a color image corresponding to a color image on a positive transparency onto a color sensitive photographic recording material comprising the steps of:

propagating a beam of multi-wavelength laser light;

scanning the transparency with said multi-wavelength beam of light;

receiving the beam as modulated by the transparency;

generating a number of electrical signals of different fixed frequencies, each of which is modulated in accordance with the intensity of a respective one of a corresponding number of different selected wavelengths present in the received modulated beam;

acoustooptically diffracting said propagated laser light in accordance with said modulated electrical signals to form a composite, collinear output beam including said selected wavelengths; and scanning said photographic recording material with said composite, collinear output beam to form a color image thereon corresponding to the image in the

26. A method of recording a color image corresponding to a color image in a negative transparency onto a color sensitive photographic recording material comprising the steps of:

propagating a beam of multi-wavelength laser light;

scanning the transparency with said multi-wavelength beam of light;

receiving the beam as modulated by the transparency;

generating a number of electrical signals of different fixed frequencies, each of which is modulated in accordance with the intensity of a respective one of a corresponding number of different selected wavelengths present in the received modulated beam;

acoustooptically diffracting said propagated laser light in accordance with said modulated electrical signals to form a composite, collinear output beam including said selected wavelengths; and scanning said photographic recording material with said composite, collinear output beam to form a color image thereon corresponding to the image in the negative transparency.

27. A method of recording a color image corresponding to a color print onto a color sensitive recording material comprising the steps of:

propagating a beam of multi-wavelength laser light;

scanning the color print with said multi-wavelength beam of light;

receiving light reflected from and modulated by the color print;

generating a number of electrical signals of different fixed frequencies, each of which is modulated in accordance with the intensity of a respective one of a corresponding number of different selected wavelengths presented in the reflected modulated light;

acoustooptically diffracting said propagated laser light in accordance with said modulated electrical signals to form a composite, collinear output beam including said selected wavelengths; and scanning said color sensitive photographic recording material with said composite, collinear output beam to form a color image thereon corresponding to that of the color print.

28. A method of recording color information carried by television signals on color sensitive motion picture film comprising the steps of:

propagating a beam of multi-wavelength laser light;

generating a number of electrical signals of different fixed frequencies, each of which is modulated in accordance with the color information carried by the television signals;

acoustooptically diffracting said propagated laser light to form a composite, collinear output beam including a number of different selected wavelengths corresponding in number to said electrical signals; and scanning the color sensitive motion picture film with said composite, collinear output beam to record a color image on said film in accordance with the color information carried by the television signals.

* * * * *

PO-1050
(5/69)

UNITED STATES PATENT OFFICE
CERTIFICATE OF CORRECTION

Patent No. 3,783,185 Dated Jan. 1, 1974

Inventor(s) Richard A. Spaulding

It is certified that error appears in the above-identified patent and that said Letters Patent are hereby corrected as shown below:

Column 15, line 62 (Claim 1, line 3), "onto" should be deleted and --into-- should be inserted in its place.

Column 19, line 1, "single" should be deleted and --signal-- should be inserted in its place.

Column 20, line 5, "bean" should be deleted and --beam-- should be inserted in its place; and line 53 (last line of claim 25) --transparency.-- should be added to complete the sentence and line.

Signed and sealed this 9th day of July 1974.

(SEAL)
Attest:

McCOY M. GIBSON, JR.
Attesting Officer

C. MARSHALL DANN
Commissioner of Patents

PO-1050
(5/69)

UNITED STATES PATENT OFFICE
CERTIFICATE OF CORRECTION

Patent No. 3,783,185 Dated Jan. 1, 1974

Inventor(s) Richard A. Spaulding

It is certified that error appears in the above-identified patent and that said Letters Patent are hereby corrected as shown below:

Column 2, line 17, delete "cam" and insert --can--.

Column 4, line 43, delete "colinear" and insert --collinear--;
line 65, delete "$\mu_3$" and insert --$\lambda_3$--.

Column 5, line 5, equation (7) "$\theta_{ij}=(\lambda_i/\nu_j)\lambda_2 f_2=(\lambda_i/\lambda_j)\theta_{22}$"
should read -- $\theta_{ij}=(\lambda_i/\nu\lambda_j)\lambda_2 f_2=(\lambda_i/\lambda_j)\theta_{22}$ --.

Column 5, line 31, equation (10)

"$\delta\theta=|\theta_{22}-\theta_{2.2}{}^{\pm}{}_1| =\lambda_2/\nu|f_2 -f_2{}^{\pm}{}_1|$."

should read

-- $\delta\theta=|\theta_{22}-\theta_{2.2\pm1}|=\lambda_2/\nu|f_2-f_{2\pm1}|$. --

Column 6, line 31, delete "sec 116 l" and insert --$sec^{-1}$--.

Column 6, line 35

| $\lambda_i$ | $\theta_{ij}$ | $\theta_{i1}$ | $\theta_{i2}$ | $\theta_{i3}$ |
|---|---|---|---|---|
| $\lambda_1$ | | 5.25 mr | 6.47 | 7.07 |
| $\lambda_2$ | | 4.61 | 5.68 | 6.21 |
| $\lambda_3$ | | 4.26 | 5.25 | 5.74 |
| $\lambda_4$ | | 3.90 | 4.80 | 5.25 |

should have circles around each value of 5.25 mr. (see next page)

PO-1050
(5/69)

UNITED STATES PATENT OFFICE
CERTIFICATE OF CORRECTION

Patent No. 3,783,185 Dated Jan. 1, 1974

Inventor(s) Richard A. Spaulding

It is certified that error appears in the above-identified patent and that said Letters Patent are hereby corrected as shown below:

| $\lambda_i \backslash \theta_{ij}$ | $\theta_{i1}$ | $\theta_{i2}$ | $\theta_{i3}$ |
|---|---|---|---|
| $\lambda_1$ | 5.25 mr | 6.47 | 7.07 |
| $\lambda_2$ | 4.61 | 5.68 | 6.21 |
| $\lambda_3$ | 4.26 | 5.25 | 5.74 |
| $\lambda_4$ | 3.90 | 4.80 | 5.25 |

Column 6, line 55, delete "typical"; line 62, delete "tupical" and insert --typical--.

Column 8, line 34, delete "single" and insert --signal--.

Signed and sealed this 1st day of October 1974.

(SEAL)
Attest:

McCOY M. GIBSON JR.
Attesting Officer

C. MARSHALL DANN
Commissioner of Patents